(12) United States Patent
Lin

(10) Patent No.: US 7,342,709 B2
(45) Date of Patent: Mar. 11, 2008

(54) OPTICAL INTERFERENCE TYPE OF COLOR DISPLAY HAVING OPTICAL DIFFUSION LAYER BETWEEN SUBSTRATE AND ELECTRODE

(75) Inventor: Wen-Jian Lin, Hsinchu (TW)

(73) Assignee: Qualcomm Mems Technologies, Inc., San Diego, CA (US)

( * ) Notice: Subject to any disclaimer, the term of this patent is extended or adjusted under 35 U.S.C. 154(b) by 68 days.

(21) Appl. No.: 10/249,243

(22) Filed: Mar. 26, 2003

(65) Prior Publication Data
US 2004/0125281 A1 Jul. 1, 2004

(30) Foreign Application Priority Data
Dec. 25, 2002 (TW) ............................... 91137264 A

(51) Int. Cl.
G02B 26/00 (2006.01)
(52) U.S. Cl. ...................... 359/290; 359/291; 359/295
(58) Field of Classification Search ................ 349/105; 359/290, 291, 292, 295, 619, 254, 230, 231, 359/245; 362/31, 32; 385/146
See application file for complete search history.

(56) References Cited

U.S. PATENT DOCUMENTS

| | | |
|---|---|---|
| 3,813,265 A | 5/1974 | Marks |
| 5,638,084 A | 6/1997 | Kalt |
| 5,771,321 A * | 6/1998 | Stern ............................ 385/31 |
| 5,914,804 A | 6/1999 | Goosen et al. |
| 5,933,183 A | 8/1999 | Enomoto et al. |
| 6,040,937 A | 3/2000 | Miles |
| 6,049,317 A | 4/2000 | Thompson et al. |
| 6,195,196 B1 * | 2/2001 | Kimura et al. ............... 359/295 |
| 6,356,378 B1 | 3/2002 | Huibers |
| 6,381,022 B1 | 4/2002 | Zavracky et al. |
| 6,522,794 B1 | 2/2003 | Bischel et al. |

(Continued)

FOREIGN PATENT DOCUMENTS

DE 196 22 748 A1 12/1997

(Continued)

OTHER PUBLICATIONS

Miles, et al., Digital Paper for reflective displays, Journal of the Society for Information Display, San Jose, CA, 11(1):209-215, 2003.

(Continued)

Primary Examiner—Michael H. Caley
(74) Attorney, Agent, or Firm—Knobbe Martens Olson & Bear LLP

(57) ABSTRACT

An optical interference color display comprising a transparent substrate, an inner-front optical diffusion layer, a plurality of first electrodes, a patterned support layer, a plurality of optical films and a plurality of second electrodes is provided. The inner-front optical diffusion layer is on the transparent substrate and the first electrodes are on the inner-front optical diffusion layer. The patterned support layer is on the inner-front optical diffusion layer between the first electrodes. The optical film is on the first electrodes and the second electrodes are positioned over the respective first electrodes. The second electrodes are supported through the patterned support layer. Furthermore, there is an air gap between the second electrodes and their respective first electrodes.

21 Claims, 4 Drawing Sheets

U.S. PATENT DOCUMENTS

| | | | |
|---|---|---|---|
| 6,642,913 B1 * | 11/2003 | Kimura et al. | 345/84 |
| 6,674,562 B1 | 1/2004 | Miles | |
| 6,738,194 B1 | 5/2004 | Ramirez et al. | |
| 6,798,469 B2 | 9/2004 | Kimura | |
| 7,042,643 B2 | 5/2006 | Miles | |
| 7,064,875 B2 | 6/2006 | Kawano et al. | |
| 7,123,216 B1 | 10/2006 | Miles | |
| 2001/0055208 A1 | 12/2001 | Kimura | |
| 2002/0126364 A1 | 9/2002 | Miles | |
| 2003/0160919 A1 | 8/2003 | Yutaka et al. | |
| 2004/0125281 A1 | 7/2004 | Lin et al. | |
| 2006/0066935 A1 | 3/2006 | Cummings et al. | |

FOREIGN PATENT DOCUMENTS

| | | |
|---|---|---|
| GB | 2278222 A | 11/1994 |
| JP | 62-009317 | 1/1987 |
| JP | 04-081816 | 3/1992 |
| JP | 05-281479 | 10/1993 |
| JP | 2001305312 | 10/2001 |
| JP | 2002-174780 | 6/2002 |
| WO | WO 95/01584 | 1/1995 |
| WO | WO 99/63394 | 12/1999 |
| WO | WO 03/056876 | 7/2003 |

OTHER PUBLICATIONS

Official Action mailed Nov. 14, 2006 in Japanese Application No. 2003-136788.

Office Action dated Nov. 3, 2006 in Taiwan Application No. 091137264.

* cited by examiner

OPTICAL INTERFERENCE TYPE OF COLOR DISPLAY HAVING OPTICAL DIFFUSION LAYER BETWEEN SUBSTRATE AND ELECTRODE

CROSS REFERENCE TO RELATED APPLICATIONS

This application claims the priority benefit of Taiwan application serial no.91137264, filed on Dec. 25, 2002.

BACKGROUND OF INVENTION

1. Field of Invention

The present invention relates to an optical interference type of color display. More particularly, the present invention relates to an optical interference type of color display having an improved color shift and contrast ratio (CR).

2. Description of Related Art

At present, lightweight and slim flat panel displays such as liquid crystal display (LCD), organic light-emitting device (OLED) or plasma display panel (PDP) are widely adopted in our everyday life. In particular, liquid crystal panels have become one of the mainstream displays. However, most LCD still has a number of drawbacks including narrow visual angle, moderate response time, need for a color filter for full coloration, and need for a polarizer leading to a poor optical utilization of light source and energy wastage by a back light module.

To improve the operating efficiency of LCD, a new type of LCD called an optical interference display is developed. The optical interference panel comprises an array of optical interference modulators. Each optical interference modulator includes a transparent electrode, a reflective electrode and a support layer for supporting the reflective electrode. Through the support of the support layer, an air gap with a specified thickness is formed between the reflective electrode and the transparent electrode. Light entering from the transparent electrode of the optical interference modulator passes through the air gap and impinges upon the second electrode. Light impinging the second electrode is reflected back to emerge from the modulator through the transparent electrode. Because light passing through air gap of different thickness may result in different degree of optical interference, different colors are produced. For example, red light, green light and blue light can be produced in this way. In addition, the design of the reflective electrode inside the optical interference modulator must integrate with a microelectromechanical system (MEMS) so that the optical interference modulator can switch between an "on" or an "off" state to illuminate or darken a spot on the panel.

The aforementioned optical interference modulators inside the optical interference display need no additional coloring filter or polarizer for producing a suitable color point and hence able to save some production cost. In addition, each optical interference modulator consumes very little electric power, quick to respond to electrical signals and operates in a bi-stable state. Therefore, the optical interference display is suitable for low power consumption products including most portable device such as mobile phone, personal digital assistant (PDA), electronic book (e-book) and so on.

FIG. 1 is a schematic sectional view of a conventional optical interference color display structure. As shown in FIG. 1, the optical interference color display 100 mainly comprises a transparent substrate 110, a patterned support layer 120, a plurality of first electrodes 130, a plurality of optical films 140 and a plurality of second electrodes 150. In general, the transparent substrate 110 is a glass substrate or a substrate made from a transparent material. The patterned support layer 120 is positioned on the transparent substrate 110 for supporting the edges of the second electrodes 150. The first electrodes 130 are also positioned on the transparent substrate 110. The first electrodes 130 are transparent electrodes fabricated using a material including indium-tin-oxide (ITO). The optical film 140 is positioned on the first electrodes 130. Typically, the optical film 140 is a composite stack having a multiple of alternately positioned high dielectric constant films and low dielectric constant films. The second electrodes 150 are positioned over the first electrodes 130. Through the support of the patterned support layer 120, the second electrodes 150 are positioned over the first electrodes 130. The second electrodes 150 are typically fabricated using a highly reflective metallic material.

In general, a conventional optical interference color panel comprises a plurality of optical interference modulators each having a different air gap thickness. As shown in FIG. 1, the air gap between the second electrode 150 and the first electrode 130 is different for different optical interference modulators. To produce color light, the optical interference modulators are designed to have three different air gap separations d1, d2 and d3. The optical interference modulator with an air gap separation of d1 emits red light; the optical interference modulator with an air gap separation of d2 emits blue light; and, the optical interference modulator with an air gap separation of d3 emits green light. In other words, as light coming from outside penetrates through the transparent substrate 110, the first electrodes 130 and the optical films 140, the light needs to pass through different air gap thickness d1, d2, d3 before arriving at the respective second electrodes 150. Thereafter, the light emerges from the transparent substrate 1100 after reflecting back by the second electrodes 150. Due to different degree of interference at different air gap thickness, red light, green light and blue light are produced.

In a conventional optical interference modulator, the second electrode 150 must be fabricated using a reflective material with good mechanical properties. When the second electrode 150 and the first electrode 130 are coupled to a bias voltage, the second electrode 150 may shift towards the first electrode 130 due to electrostatic attraction. Any movement of the second electrode 150 may lead to a slight variation of the air gap d1, d2 and d3. Through a slight change in the thickness of the air gaps d1, d2, and d3, various optical interference modulators (pixels) within the display can be switched to an "on" or an "off" state.

In the optical interference color display 100, images on display may be affected by user's viewing angle due to an intensification of color shift and a deterioration of contrast ratio. Thus, the conventional technique often demands the attachment of an optical diffusion plate 160 to the outer surface of the transparent substrate 110 for improving color shift and contrast ratio. However, the attachment of an optical diffusion plate not only increases the overall thickness of the color display 100 (an additional thickness of about 2 mm), but also increases material cost.

SUMMARY OF INVENTION

Accordingly, one object of the present invention is to provide an optical interference color display having an improved color shift and contrast ratio by forming layers of films inside a panel instead of attaching an optical diffusion plate outside the panel.

To achieve these and other advantages and in accordance with the purpose of the invention, as embodied and broadly described herein, the invention provides an optical interference color display. The optical interference color display mainly comprises a transparent substrate, an inner-front optical diffusion layer, a plurality of first electrodes, a patterned support layer, a plurality of optical films and a plurality of second electrodes. The inner-front optical diffusion layer is positioned on the transparent substrate. The first electrodes are positioned on the inner-front optical diffusion layer. The patterned support layer is also positioned on the inner-front optical diffusion layer but between the first electrodes. The optical films are positioned over the first electrodes. The second electrodes are positioned over the respective first electrodes and supported by the patterned support layer. In addition, there is an air gap between each first and second electrode pair.

In this embodiment, the inner-front optical diffusion layer includes, for example, a first film and a second film. The first film is directly attached to the transparent substrate and the second film is positioned on the first film. The interface between the first film and the second film further provides a dispersive surface. The first film is fabricated using indium-tin-oxide and the second film is fabricated using silicon nitride or silicon oxide, for example.

In this embodiment, the surface of second electrode facing the first electrode may further include an inner-back optical diffusion layer. The inner-back optical diffusion layer is fabricated on the optical interference color display in the same process as fabricating the inner-front optical diffusion layer. Furthermore, this invention also permits the formation of the inner-back optical diffusion layer without an inner-front optical diffusion layer.

In this embodiment, the inner-back optical diffusion layer is supported by the patterned support layer and separated from the first electrode by an air gap. The inner-back optical diffusion layer includes, for example, a third film and a fourth film. The third film is directly attached to the first electrode and the fourth film is positioned over the third film. The interface between the third film and the fourth film further provides a dispersive surface. The third film is fabricated using indium-tin-oxide and the fourth film is fabricated using silicon nitride or silicon oxide, for example.

In this embodiment, the transparent substrate is, for example, a glass substrate. The first electrodes are transparent electrodes fabricated using, for example, indium-tin-oxide. The second electrodes are metallic electrodes fabricated using, for example, molybdenum, molybdenum alloy, aluminum, aluminum alloy, chromium or other conductive metallic materials.

In this embodiment, the optical film comprises, for example, at least a first dielectric film and at least a second dielectric film. The second dielectric film and the first dielectric film are alternately stacked over each other. The second dielectric film has a dielectric constant that differs from the first dielectric film.

This invention permits selective deployment of an inner-front optical diffusion layer and an inner-back optical diffusion layer. The optical diffusion layer replaces the attached optical diffusion plate structure in a conventional design and improves display properties including the color shift and contrast ratio.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
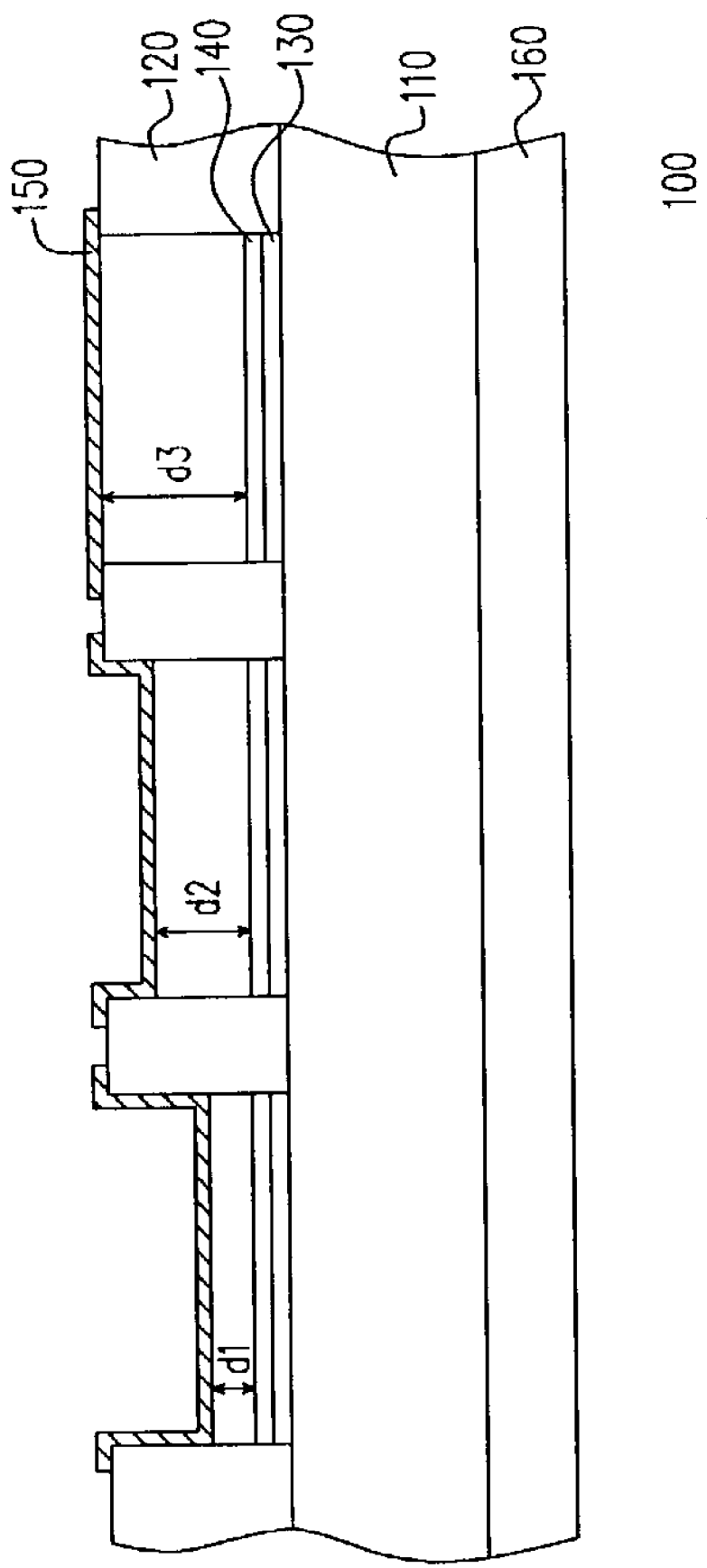
FIG. 1 is a schematic sectional view of a conventional optical interference color display structure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
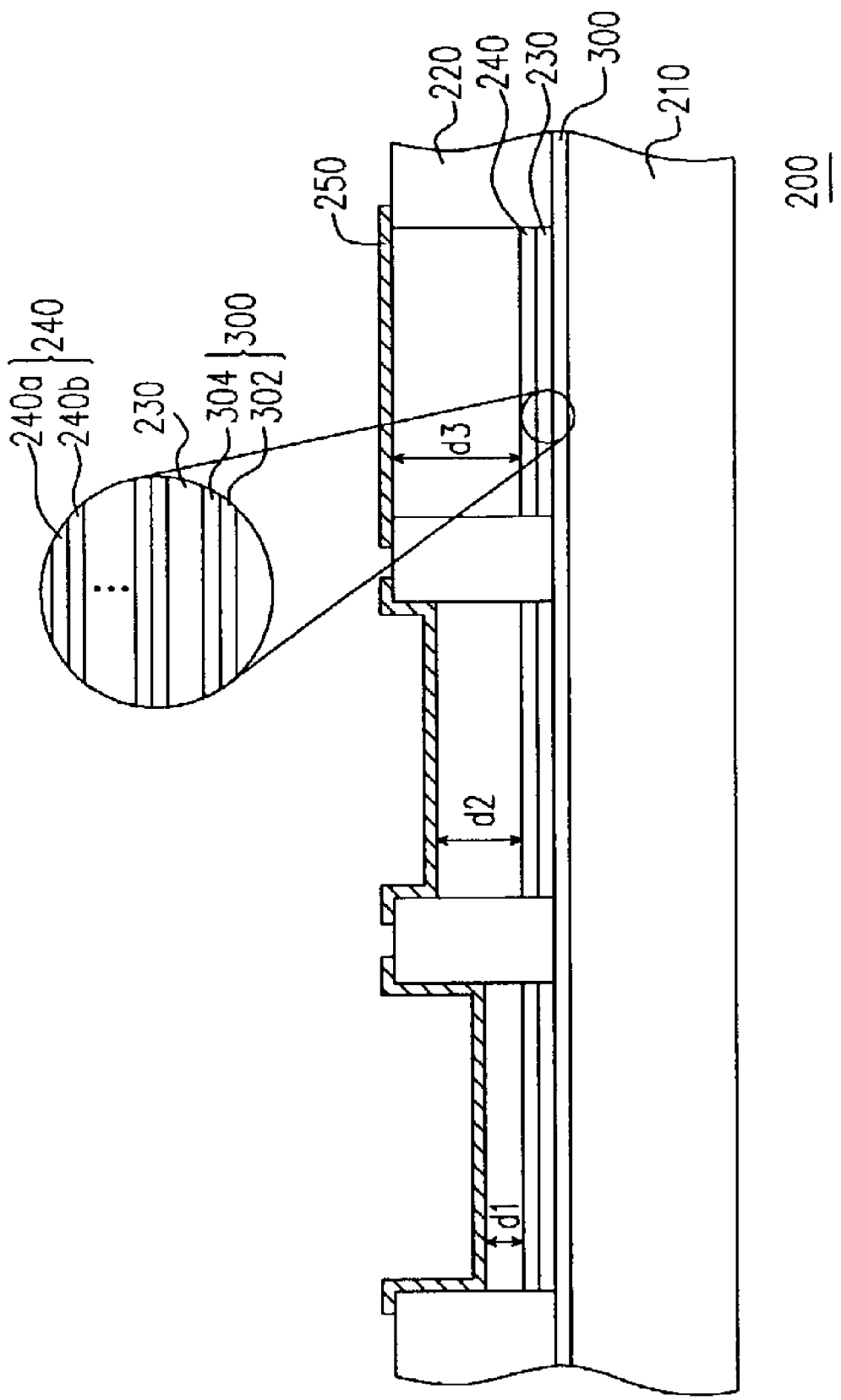
FIG. 2 is a schematic sectional view of an optical interference color display structure according to a first preferred embodiment of this invention.

FIG. 2 is a schematic sectional view of an optical interference color display structure according to a first preferred embodiment of this invention. As shown in FIG. 2, the optical interference color panel 200 mainly comprises a transparent substrate 210, an inner-front optical diffusion layer 300, a patterned support layer 220, a plurality of first electrodes 230, a plurality of optical films 240 and a plurality of second electrodes 250. The inner-front optical diffusion layer 300 is positioned over the transparent substrate 210 covering the entire surface of the transparent substrate 210, for example. The patterned support layer 220 is also positioned over the transparent substrate 210 for supporting the edges of the second electrodes 250. The first electrodes 230 are positioned on the transparent substrate 210. The optical films 240 are positioned on the first electrodes 230. The second electrodes 250 are positioned over the respective first electrodes 230 and supported through the patterned support layer 220.

In this embodiment, the transparent substrate 210 is, for example, a glass substrate or a substrate made from some other transparent materials. The patterned support layer 220 may include a plurality of cylindrical bodies fabricated using, for example, resinous material. The first electrodes 230 are transparent electrodes fabricated using, for example, indium-tin-oxide (ITO). The optical film 240 includes, for example, at least a first dielectric film 240a and a second dielectric film 240b alternately stacked over each other. The second dielectric film 240a has a dielectric constant that differs from the first dielectric film 240b. Since the second electrodes 250 serves as reflective electrodes, the second electrodes 250 must have good mechanical properties. Hence, the second electrodes 250 are fabricated using a sturdy material including, for example, aluminum or an alloy of aluminum.

To produce a color display, the optical interference modulators inside the optical interference color panel 200 are fabricated with one of three different air gap thickness (d1, d2 and d3). For example, an optical interference modulator having an air gap thickness of d1 emits red light. Similarly, an optical interference modulator having an air gap thickness of d2 emits blue light and an optical interference modulator having an air gap thickness of d3 emits green light. In other words, external light passing through the transparent substrate 210, the inner-front diffusion layer 300, the first electrode 230 and the optical film 240 will have to pass through an air gap of different thickness (d1, d2, d3) before reacting the second electrode 250. Thereafter, the light is reflected back from the second electrode 250 to emerge as an output beam through the transparent substrate 210. Due to a different degree of interference through the optical path, red, green and blue light are produced accordingly.

In general, the second electrode 250 serves as a reflective electrode and has good mechanical properties. When a bias voltage is applied between the second electrode 250 and the first electrode 230, the second electrode 250 will move slightly towards the first electrode 230 due to electrostatic attraction. Such movement changes the air gap d1, d2 or d3 inside the optical interference modulator. In other words, through a change in the air gap thickness d1, d2 or d3 inside the optical interference modulator, the "on" state or the "off" state of optical interference modulators (pixels) is set.

To improve color shift and reduce contrast ratio deterioration, this invention also provides an inner-front optical diffusion plate 300 on the transparent substrate 210.

The inner-front optical diffusion plate 300 includes, for example, a first film 302 and a second film 304. The first film 302 is attached to the transparent substrate 210 and the second film 304 is positioned over the first film 302. The interface between the first film 302 and the second film 304 provides a dispersive surface. The first film 302 is fabricated using a material including, for example, indium-tin-oxide. The second film 304 is fabricated using a material including, for example, silicon nitride or silicon oxide. In addition, the inner-front optical diffusion plate 300 is formed over the transparent substrate 210, for example, by conducting a plasma-enhanced chemical vapor deposition (PECVD) with the processing conditions shown in Table 1 below.

TABLE 1

| | Gas flow rate of reactive gases | Power rating | Thickness | Temperature |
|---|---|---|---|---|
| Indium-tin-oxide (ITO) reaction | Ar: 100 sccm<br>O$_2$: 1.0 sccm | 3.4 kW | 420 Å | Room Temperature |
| Silicon nitride indium-tin-oxide reaction | N$_2$: 5000 sccm<br>HN$_3$: 2000 sccm<br>SiH$_4$: 350 sccm | 2100 kW | 6000 Å | 380° C. |

Figure 3:
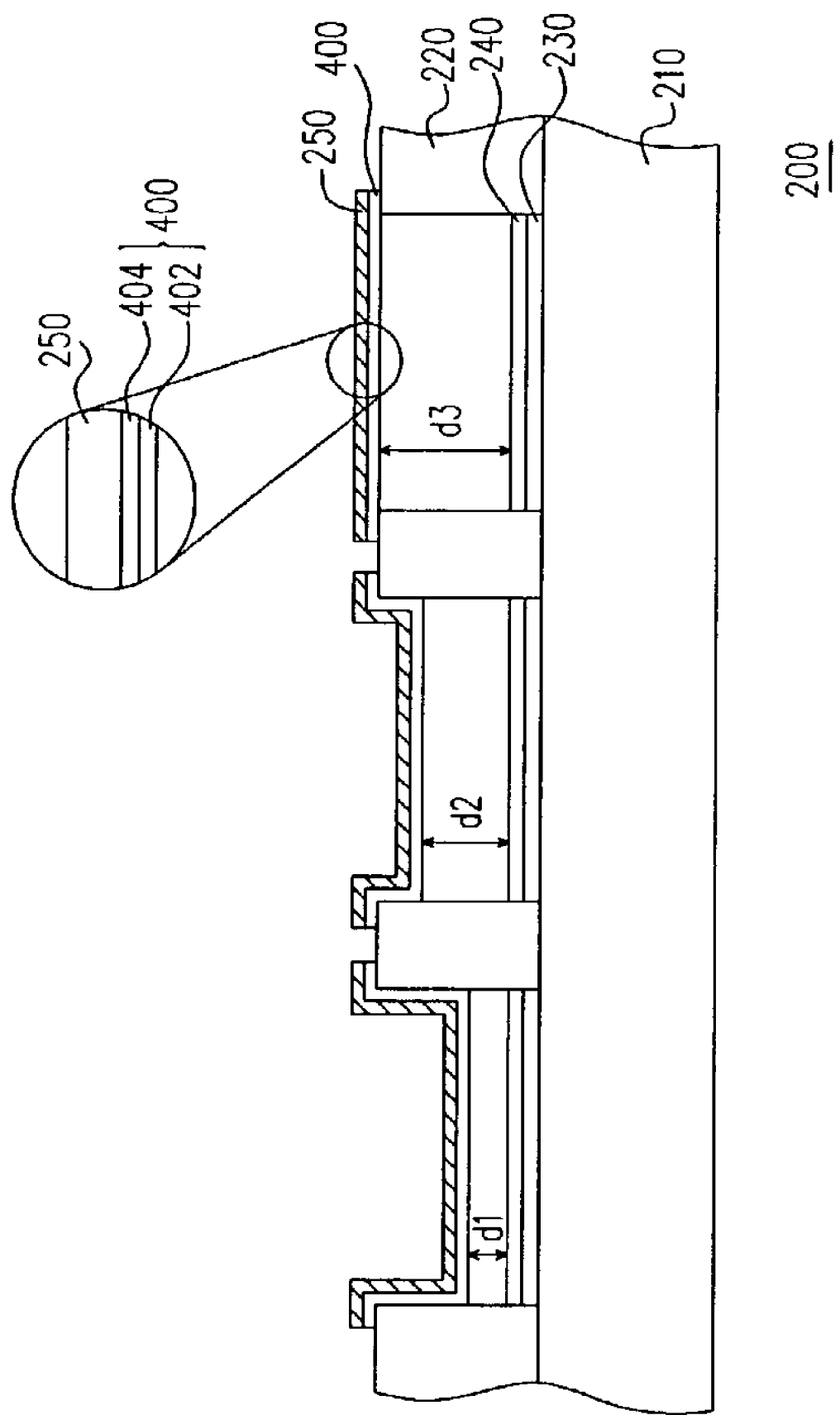
FIG. 3 is a schematic sectional view of an optical interference color display structure according to a second preferred embodiment of this invention.

FIG. 3 is a schematic sectional view of an optical interference color display structure according to a second preferred embodiment of this invention. As shown in FIG. 3, an inner-back optical diffusion layer 400 is formed on the surface of the second electrode 250 facing the first electrode 230. The inner-back optical diffusion layer 400 is supported by the patterned support layer 220 and separated from the first electrode 230 by an air gap thickness of d1 , d2 or d3 . The inner-back optical diffusion layer 400 comprises, for example, a third film 402 and a fourth film 404. The third film 402 is positioned over the first electrode 230 and the fourth film 404 is positioned over the third film 402. The interface between the third film 402 and the fourth film 404 provides a dispersive surface. The third film 402 is fabricated using a material including, for example, indium-tin-oxide. The fourth film 404 is fabricated using a material including, for example, silicon nitride or silicon oxide.

Figure 4:
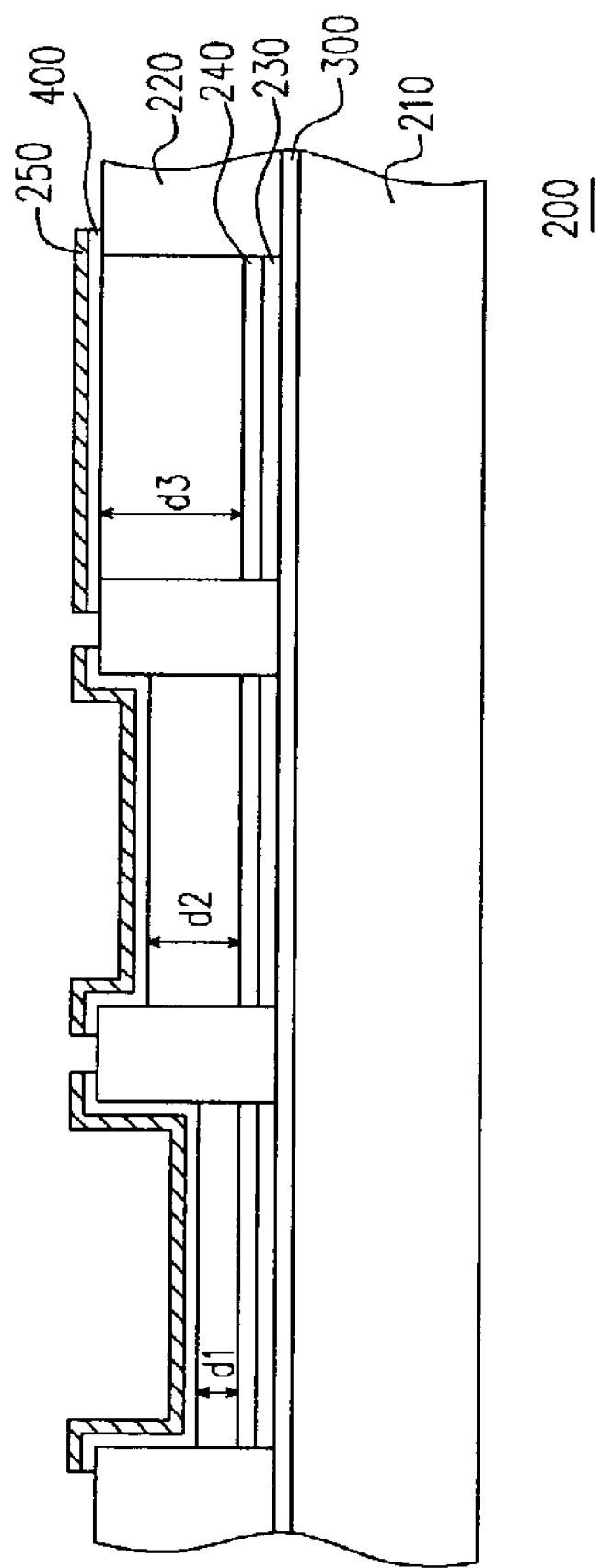
FIG. 4 is a schematic sectional view of an optical interference color display structure according to a third preferred embodiment of this invention.

FIG. 4 is a schematic sectional view of an optical interference color display structure according to a third preferred embodiment of this invention. As shown in FIG. 4, the optical interference color display has a structure similar to the first and the second embodiment. One major difference is that an inner-front optical diffusion layer 300 and an inner-back optical diffusion layer 400 are formed inside the optical interference color panel 200. After integrating the inner-front optical diffusion layer 300 and the inner-back optical diffusion layer 400, color shift and contrast ratio deterioration are improved leading to a better overall performance in the optical interference color panel 200.

In conclusion, the optical interference color pane has at least the following advantages:

1. The inner-front optical interference layer and the inner-back optical interference layer can be selectively employed or both can be used together to supplant the conventional attached optical diffusion plate so that both color shift and contrast ratio deterioration are improved.

2. The inner-front optical diffusion layer and/or the inner-back optical interference diffusion layer can be fabricated by conducting a plasma-enhanced chemical vapor deposition. This method of fabrication is more effective in controlling the optical properties including dispersion of various optical diffusion layers. In other words, overall luminance of the panel is increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. An optical interference color display, comprising:
    a transparent substrate;
    a plurality of first electrodes over the transparent substrate;
    an inner-front optical diffusion layer positioned between the transparent substrate and the first electrodes;
    a patterned support layer on the inner-front optical diffusion layer, wherein the patterned support layer is between the first electrodes;
    a plurality of optical films on the first electrodes; and
    a plurality of second electrodes over the respective first electrodes,
    wherein the second electrodes are supported through the patterned support layer and there is an air gap between every pair of second electrode and first electrode.

2. The color display of claim 1, wherein the inner-front optical diffusion layer further includes:
    a first film on the transparent substrate; and
    a second film on the first film, wherein the interface between the first film and the second film forms a dispersive surface.

3. The color display of claim 2, wherein the first film is fabricated using a material including indium-tin-oxide and the second film is fabricated using a material including silicon nitride or silicon oxide.

4. The color display of claim 1, wherein the display further includes an inner-back optical diffusion layer on the second electrodes facing the surface of the first electrodes and there is an air gap between the inner-back diffusion layer and the respective first electrodes.

5. The color display of claim 4, wherein the inner-back optical diffusion layer is supported through the patterned support layer.

6. The color display of claim 4, wherein the inner-back optical diffusion layer further includes:
   a third film on the first electrode and supported by the patterned support layer; and
   a fourth film on the third film, wherein the interface between the third film and the fourth film forms a dispersive surface.

7. The color display of claim 6, wherein the third film is fabricated using a material including indium-tin-oxide and the fourth film is fabricated using a material including silicon nitride or silicon oxide.

8. The color display of claim 1, wherein the first electrodes are transparent electrode and that the first electrodes are fabricated using a material including indium-tin-oxide.

9. The color display of claim 1, wherein the second electrodes are metallic electrodes and that the second electrodes are fabricated using a material selected from a group consisting of molybdenum, molybdenum alloy, aluminum, aluminum alloy, chromium or a combination of them.

10. The color display of claim 1, wherein the transparent substrate includes a glass substrate or a plastic substrate.

11. The color display of claim 1, wherein each optical film includes:
   at least a first dielectric film; and
   at least a second dielectric film, wherein the second dielectric film and the second dielectric film are alternately stacked over each other and that the second dielectric film has a dielectric constant different from the first dielectric film.

12. An optical interference color display, comprising:
   a transparent substrate;
   a plurality of first electrodes over the transparent substrate;
   an inner-front optical diffusion layer positioned comprising two layers made of different materials between the transparent substrate and the first electrodes;
   a patterned support layer on the inner-front optical diffusion layer, wherein the patterned support layer is between the first electrodes;
   a plurality of optical films on the first electrodes; and
   a plurality of second electrodes over the respective first electrodes,
   wherein the second electrodes are supported through the patterned support layer and there is an air gap between every pair of second electrode and first electrode.

13. The color display of claim 12, wherein the inner-front optical diffusion layer further includes:
   a first film on the transparent substrate; and
   a second film on the first film, wherein the interface between the first film and the second film forms a dispersive surface, and wherein the first film is fabricated using a material including indium-tin-oxide and the second film is fabricated using a material including silicon nitride or silicon oxide.

14. The color display of claim 12, wherein the display further includes an inner-back optical diffusion layer on the second electrodes facing the surface of the first electrodes and there is an air gap between the inner-back diffusion layer and die respective first electrodes.

15. The color display of claim 14, wherein the inner-back optical diffusion layer is supported through the patterned support layer.

16. The color display of claim 14, wherein the inner-back optical diffusion layer further includes:
   a third film on the first electrode and supported by the patterned support layer; and
   a fourth film on the third film, wherein the interface between the third film and the fourth film forms a dispersive surface.

17. The color display of claim 16, wherein the third film is fabricated using a material including indium-tin-oxide and the fourth film is fabricated Using a material including silicon nitride or silicon oxide.

18. The color display of claim 12, wherein the first electrodes are transparent electrode and that the first electrodes are fabricated using a material including indium-tin-oxide.

19. The color display of claim 12, wherein the second electrodes are metallic electrodes and that the second electrodes are fabricated using a material selected from a group consisting of molybdenum, molybdenum alloy, aluminum, aluminum alloy, chromium or a combination of them.

20. The color display of claim 12, wherein the transparent substrate includes a glass substrate or a plastic substrate.

21. The color display of claim 12, wherein each optical film includes:
   at least a first dielectric film; and
   at least a second dielectric film, wherein the second dielectric film and the second dielectric film are alternately stacked over each other and that the second dielectric film has a dielectric constant different from the first dielectric film.

* * * * *

UNITED STATES PATENT AND TRADEMARK OFFICE
CERTIFICATE OF CORRECTION

PATENT NO. : 7,342,709 B2  Page 1 of 1
APPLICATION NO. : 10/249243
DATED : March 11, 2008
INVENTOR(S) : Wen-Jian Lin It is certified that error appears in the above-identified patent and that said Letters Patent is hereby corrected as shown below:

Column 5, line 58, delete "d1 ," and insert -- d1, --

Column 5, lines 58-59, delete "d3 ." and insert -- d3. --

Column 8, line 12, in Claim 14, delete "die" and insert -- the --

Column 8, line 25, in Claim 17, delete "Using" and insert -- using --

Signed and Sealed this

Eighteenth Day of November, 2008

JON W. DUDAS
*Director of the United States Patent and Trademark Office*